(12) United States Patent
Kitani et al.

(10) Patent No.: US 6,320,299 B1
(45) Date of Patent: Nov. 20, 2001

(54) FRICTION MEMBER USED IN VIBRATION WAVE DRIVING APPARATUS, AND DEVICE USING THE VIBRATION WAVE DRIVING APPARATUS AS DRIVING SOURCE

(75) Inventors: Koji Kitani, Chofu; Naruto Sugimoto, Machida, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/479,246

(22) Filed: Jan. 7, 2000

(30) Foreign Application Priority Data

Jan. 11, 1999 (JP) .................................................. 11-003947

(51) Int. Cl.$^7$ .................................................. H02N 01/00
(52) U.S. Cl. .............................. 310/323.04; 310/323.11; 310/323.05
(58) Field of Search .................... 310/323.04, 323.05, 310/323.11

(56) References Cited

U.S. PATENT DOCUMENTS

| | | | |
|---|---|---|---|
| 4,978,882 | 12/1990 | Kitani ................................... | 310/328 |
| 5,028,833 * | 7/1991 | Kawai ................................... | 310/323 |
| 5,041,750 | 8/1991 | Kitani ................................... | 310/323 |
| 5,066,884 * | 11/1991 | Takagi et al. ........................ | 310/323 |
| 5,148,075 * | 9/1992 | Shirasaki .............................. | 310/323 |
| 5,150,000 * | 9/1992 | Imasaka et al. ..................... | 310/323 |
| 5,157,300 | 10/1992 | Kataoka et al. ..................... | 310/323 |
| 5,311,094 * | 5/1994 | Imasaka et al. ..................... | 310/323 |
| 5,912,525 * | 6/1999 | Kobayashi et al. .................. | 310/328 |
| 5,917,269 | 6/1999 | Maruyama et al. .................. | 310/323 |

* cited by examiner

*Primary Examiner*—Nestor Ramirez
*Assistant Examiner*—Peter Medley
(74) *Attorney, Agent, or Firm*—Fitzpatrick, Cella, Harper & Scinto

(57) ABSTRACT

A friction member is used in a friction portion in a vibration wave driving apparatus. The friction member comprises a composite resin which comprises polytetrafluoroethylene as a matrix and which further comprises at least an inorganic fiber substance and a heat-resistant resin. A ratio of a content Vf (vol %) of the inorganic fiber substance to a content Vr (vol %) of the heat-resistant resin satisfies the following relation:

$$1/3 \leq Vf/Vr \leq 3.$$

21 Claims, 3 Drawing Sheets

FRICTION MEMBER USED IN VIBRATION WAVE DRIVING APPARATUS, AND DEVICE USING THE VIBRATION WAVE DRIVING APPARATUS AS DRIVING SOURCE

BACKGROUND OF THE INVENTION

1. Field of the Invention

The present invention relates to a friction member used in a vibration wave driving apparatus which drives using a vibration wave, and a device using the vibration wave driving apparatus as a driving source.

2. Related Background Art

The following schematically describes the principle of a vibration wave motor which is a typical example of the vibration wave driving apparatus making use of a traveling vibration wave. A vibration member (stator) is constructed in such structure that two groups of piezoelectric elements arranged in the circumferential direction are fixed to one surface of a ring elastic member of an elastic material whose total length is an integral multiple of a certain length $\lambda$. These piezoelectric elements are arranged at the pitch of $\lambda/2$ and in alternately inverse expansive polarities in each group. The piezoelectric elements are arranged with a shift equal to an odd multiple of $\lambda/4$ between the two groups. The two groups of piezoelectric elements are provided each with an electrode film. When an alternating voltage is applied to only either one group (hereinafter referred to as phase A), the above vibration member generates throughout the entire circumference thereof a standing wave (of the wavelength $\lambda$) of such bending vibration that antinodes are located at center points of the respective piezoelectric elements in the group and at points every $\lambda/2$ apart therefrom and that nodes are located at center points between the positions of the antinodes. When the alternating voltage is applied to only the other group (hereinafter referred to as phase B), the standing wave also appears similarly, though the positions of the antinodes and nodes are shifted by $\lambda/4$ from those of the standing wave in phase A.

When alternating voltages having an equal frequency and a temporal phase difference of 90° between them are applied to the respective phases A, B, the two standing waves are combined, so that a traveling wave (of the wavelength $\lambda$) of such bending vibration as to vibrate in the circumferential direction appears in the vibration member. At this time, each point in the above vibration member having the thickness is in elliptic motion. If a movement member (rotor), for example a ring movement member, is kept in press contact with one surface of the vibration member, the movement member will be subject to frictional force along circumferential direction from the vibration member, so as to be rotated. It is verified that when a plurality of radial grooves are formed in the circumferential direction on the other side than the fixing surface of the piezoelectric elements in the vibration member in order to increase the circumferential component of the elliptic motion, the neutral plane of vibration is shifted toward the fixing surface of piezoelectric elements, the rotational frequency increases even without change in the amplitude, and the effect of also increasing motor efficiency is great. The grooves also present the effect of removing abrasion powder.

On the basis of the above principle, the vibration wave motor has the following advantages:

1) it has holding torque during no power supply and does not bring about hunting during positioning operation;

2) a rise and a fall of rotation are quick (i.e., a mechanical time constant is small), because inertia is small and driving torque is large;

3) it is free of cogging, because equal driving force is generated at all points on the circumference; and so on.

It can be mentioned from these advantages that the vibration wave motor is suitable for high precision rotation and high precision positioning in terms of the principle, but it has the disadvantage of change in motor performance according to change of the friction surfaces with time because of abrasion of the friction portions. A variety of friction materials of composite resins have been proposed heretofore in order to compensate for the disadvantage. Among them, polytetrafluoroethylene (hereinafter referred to as PTFE) resins filled with various fillers have been proposed as materials having both stability of friction performance and durability, as disclosed in Japanese Patent Applications Laid-Open Nos. 1-206880, 2-285974, 5-184168, and so on.

Many PTFE resins are commonly used as friction materials, without being limited only to the vibration wave motors. While the PTFE resins are kept sliding, they suffer laminar exfoliation, because they are materials having low surface energy from the molecular aspect. Since such materials suffering laminar exfoliation have the action of stabilizing coefficients of friction in low levels, they are often used as additives for the friction materials, for example, like graphite, molybdenum disulfide, and mica. When PTFE among them is used as an additive, it is unlikely to damage a counterpart because of its low elastic modulus. In addition, an elongation characteristic of the PTFE is great, because it is a polymer material. Therefore, it is easy to transfer to the counterpart and it is considered that friction occurs between the PTFE transferred to the counterpart during friction (which is generally called "transfer film") and PTFE, thus accomplishing a stable friction state with a low coefficient of friction.

However, since PTFE is apt to suffer the laminar exfoliation under friction without any additive, it has the disadvantages of great abrasion and being prone to creep because of its low elastic modulus. For compensating for the disadvantages, there are two techniques employed.

The first technique is a method of adding the PTFE to another strong resin (for example, thermosetting or thermoplastic polyimide, polyamideimide, polyetherimide, polyether ether ketone, polyether sulfone, etc.). However, this technique often fails to achieve the stable friction state because of great influence of the matrix resin. When the vibration wave motor was actually constructed using these composite resins as friction materials, abrasion of the matrix resin was heavy and the abrasion powder was jammed in and stuck to the friction portions. This made output very unstable. Therefore, it is difficult to use these composite resins well.

The other technique is a method of using PTFE as a matrix and adding various fillers thereto in order to improve the creep characteristic and abrasion resistance. For example, materials commercially available are PTFE resins containing glass fiber, carbon fiber, aromatic polyester powder, and polyimide powder. In the case of the PTFE resins with only either of polyimide, aromatic polyester, etc., coefficients of friction sometimes decrease with driving time, so as to deteriorate the torque performance of the vibration wave motor in certain cases. In the case of the composite resins with only either of carbon fiber, glass fiber, etc., abrasion is sometimes great and it is also conceivable that the motor performance could become instable, including variation in the torque performance, occurrence of noise, and so on.

SUMMARY OF THE INVENTION

The present invention is directed to a friction member used in a vibration wave driving apparatus, the friction member comprising a composite resin which comprises polytetrafluoroethylene as a matrix and which further comprises at least one inorganic fiber substance and at least one heat-resistant resin, wherein a ratio of a content Vf (vol %) of said inorganic fiber substance to a content Vr (vol %) of said heat-resistant resin satisfies the relation of $1/3 \leq Vf/Vr \leq 3$, thereby accomplishing improvement in abrasion and noise.

The other objects will become apparent with the detailed description which follows.

DETAILED DESCRIPTION OF THE PREFERRED EMBODIMENTS

Figure 1A:
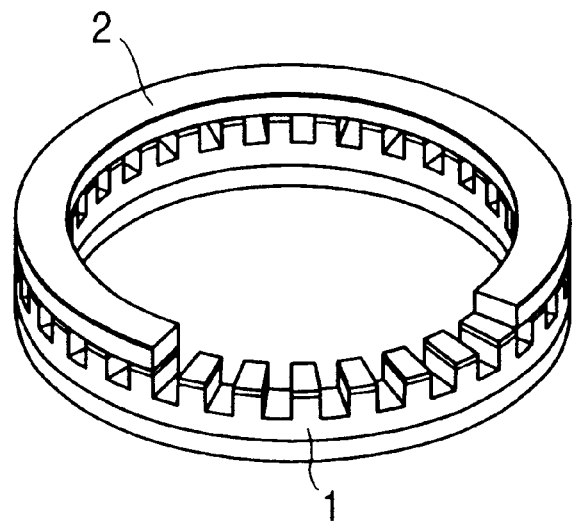
FIG. 1A and FIG. 1B are schematic diagrams to show frictional contact portions in a vibration wave motor as an embodiment of the vibration wave driving apparatus.

The friction member of the present embodiment is a friction member used in a contact portion between the vibration member and the movement member in the vibration wave driving apparatus in which the alternating voltage is applied to electromechanical energy conversion elements to form the traveling vibration wave in the vibration member fixed to the electromechanical energy conversion elements, thereby causing relative movement of the movement member kept in press contact with the vibration member by frictional force, wherein a material of the friction member is a composite resin comprising polytetrafluoroethylene (PTFE) as a matrix and further comprising at least one inorganic fiber substance and at least one heat-resistant resin and wherein a ratio of a content Vf (vol %) of the inorganic fiber substance to a content Vr (vol %) of the heat-resistant resin satisfies the relation of $1/3 \leq Vf/Vr \leq 3$.

In order to accomplish the present embodiment, studies have been conducted on the vibration wave motors in which the friction member was made of either of materials containing carbon fiber as the inorganic fiber substance or aromatic polyester, polyimide, etc. as the heat-resistant resin independently of each other in the matrix of PTFE and observation was made for the friction surfaces of the vibration wave motors encountering trouble in motor performance. There were differences among the transfer films of the respective materials. For example, in the case of samples of PTFE with only the heat-resistant resin such as aromatic polyester, polyimide, or the like, the transfer film containing the principal component of the PTFE resin was stuck throughout the entire surface of the friction part of the counterpart and there were variations of about 0.2 to 3 μm in the thickness.

On the other hand, in the case of samples of PTFE with carbon fiber, the transfer films were attached in a mottled pattern to the counterpart and the thicknesses thereof were about 0.3 μm in the portions of the transfer films attached. In the case of samples of PTFE with glass fiber, the transfer films were also attached in the mottled pattern to the counterpart and the thicknesses thereof had some variations, 0.3 to 0.8 μm, when compared with the samples of carbon fiber.

From the qualitative aspect, in the case of the PTFE composite resins, the coefficients of friction are considered to become smaller and stabler as the area of the surface covered with the transfer film(s) increases and as the surface becomes smoother. It is also considered that the fiber substance such as carbon fiber, glass fiber, or the like frictionally moves during sliding motion while being caught in the transfer film of PTFE, which is relatively soft in the friction surface, and thus it increases the coefficient of friction, or shaves the transfer film, and reinforces the matrix resin, so as to suppress the laminar exfoliation of PTFE.

Thus noting the state of the transfer film, the present embodiment employs the composite resin containing PTFE as a matrix and further containing at least one inorganic fiber substance and at least one heat-resistant resin and selects the ratio of the additives so that the ratio of the content Vf (vol %) of the inorganic fiber substance to the content Vr (vol %) of the heat-resistant resin satisfies the relation of $1/3 \leq Vf/Vr \leq 3$, thereby obtaining the vibration wave driving apparatus with excellent abrasion characteristics and a long life and with little change in the torque performance with time while maximizing the advantages of the respective fillers.

The vibration wave driving apparatus of the present embodiment is characterized in that the above friction member is used for either one of the contact portions between the vibration member and the movement member.

The vibration wave driving apparatus of the present embodiment can be applied, for example, to the vibration wave motors, sheet feed devices, linear motors, and so on.

The vibration wave driving apparatus of the present embodiment can also be used as a driving source in a variety of devices. Specific examples of such devices include optical devices such as cameras and the like, office machines such as printers, copiers, and the like, automobile-related devices such as power windows, active suspensions, and the like.

The present invention will be explained based on examples illustrated in the figures.

Figure 1B:
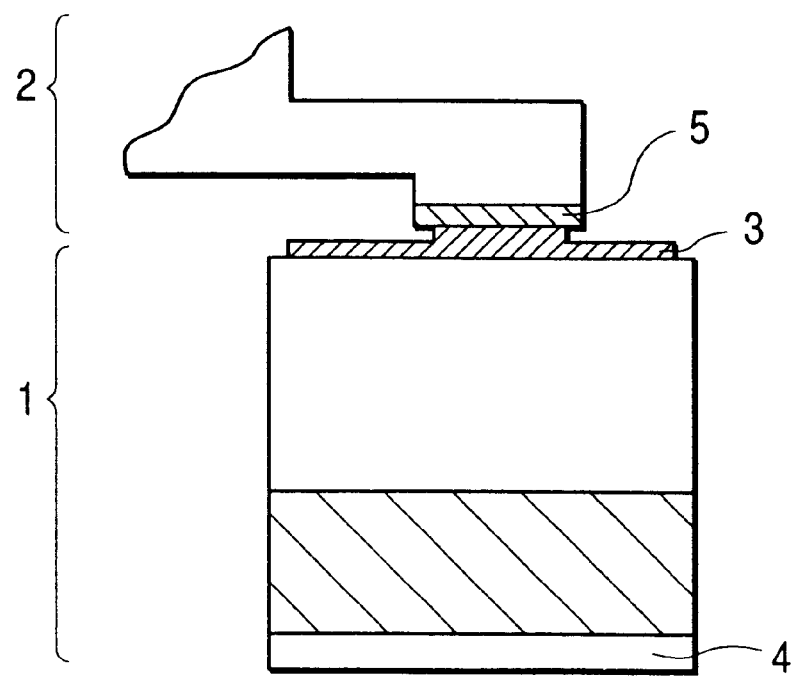

FIGS. 1A and 1B are schematic diagrams to show the frictional contact portions in the vibration wave motor as an embodiment of the vibration wave driving apparatus. FIG. 1A is a schematic perspective view and FIG. 1B is a schematic cross-sectional view. In the figures, reference numeral 1 designates the vibration member, in which the piezoelectric element groups, which are formed in the ring shape of two groups of piezoelectric elements 4 polarized in plural poles as described previously, are bonded concentrically with a heat-resistant epoxy resin base adhesive to one end face of the ring metal vibration member having the elastic modulus comparable to that of the metal of the structural material and, for example, made of stainless steel, steel, brass, phosphor bronze, an aluminum alloy, or the like, in which the PTFE composite resin treated so as to be able to be bonded by a sodium etching treatment or the like is similarly bonded as a friction member 3 to the other end face, and in which a plurality of grooves are regularly formed in a comb-teeth pattern in the circumferential direction in the surface on the PTFE composite resin side in order to increase the motor efficiency.

Numeral 2 designates the movement member, which is made in the ring shape of an aluminum alloy and whose surface opposed to the vibration member 1 is coated with tungsten carbide sprayed as a friction surface of friction member 5 and is finished to moderate surface roughness by a method such as lapping, polishing, or the like.

The friction surface of the vibration member 1 and the friction surface of the movement member 2 are in press contact with each other, for example, under the load of 10 kgf in the axial direction by a pressing plate spring not illustrated. Radial level differences of the friction surface of the vibration member differ depending upon abrasion margins of respective vibration wave motors, but a desired level difference is not more than 1.0 mm for efficient transmission of vibration, because the PTFE composite resin has the small elastic modulus.

When the alternating voltage of the natural frequency of the vibration member 1 is applied to the two groups of piezoelectric elements 4 comprised of those alternately polarized in the direction of thickness, the vibration member 1 undergoes resonance to generate the traveling vibration wave in the circumferential direction thereof and the movement member 2 in press contact with the vibration member 1 is rotated by the frictional force between the friction surfaces of the vibration member 1 and the movement member 2.

Samples of examples were made as follows; the friction member 3 of the vibration member 1 was made using various composite resins containing various contents of carbon fiber and polyimide in the matrix of PTFE and baked at 360° C. to 380° C., the friction surfaces of the two members were lapped, and thereafter the vibration wave motors were constructed. The vibration wave motors of the respective examples were subjected to continuous rotation at about 100 rpm for twenty hours and were checked as to the motor characteristics, the form and thickness of transfer film, and abrasion loss of the composite resins. The results are shown in Table 1 and Table 2.

The contents of the respective materials of PTFE, carbon fiber, and polyimide are indicated in volume percentages (volt) and the samples were prepared by reducing the volume percentages to values of (volume percentage)/(specific gravity) from their specific gravities and volume percentages. The values of the specific gravities used at that time were as follows; PTFE=2.2, polyimide=1.4, and carbon fiber=1.8 (in units of g/cc).

TABLE 1

| | Carbon fiber (vol %) | Polyimide (vol %) | Ratio (carbon fiber/polyimide) | Amount of total additives (vol %) |
|---|---|---|---|---|
| Example 1 | 5 | 15 | 0.33 | 20.0 |
| Example 2 | 8 | 15 | 0.53 | 23.0 |
| Example 3 | 12 | 15 | 0.80 | 27.0 |
| Example 4 | 5 | 5 | 1.00 | 10.0 |
| Example 5 | 15 | 15 | 1.00 | 30.0 |
| Example 6 | 12 | 10 | 1.20 | 22.0 |
| Example 7 | 8 | 5 | 1.60 | 13.0 |
| Example 8 | 12 | 5 | 2.40 | 17.0 |
| Example 9 | 18 | 6 | 3.00 | 24.0 |
| Example 10 | 4 | 4 | 1.00 | 8.0 |
| Comparative Example 1 | 0 | 25 | 0.00 | 25.0 |
| Comparative Example 2 | 2 | 15 | 0.13 | 17.0 |
| Comparative Example 3 | 2 | 2 | 1.00 | 4.0 |
| Comparative Example 4 | 20 | 15 | 1.33 | 35.0 |

TABLE 1-continued

| | Carbon fiber (vol %) | Polyimide (vol %) | Ratio (carbon fiber/polyimide) | Amount of total additives (vol %) |
|---|---|---|---|---|
| Comparative Example 5 | 20 | 5 | 4.00 | 25.0 |
| Comparative Example 6 | 20 | 0 | — | 20.0 |

TABLE 2

| | Transfer film form | thickness ($\mu$m) | Torque stability | Noise | Abrasion loss ($\mu$m) |
|---|---|---|---|---|---|
| Example 1 | on whole surface | 0.3 to 0.6 | stable | ○ | 5 to 8 |
| Example 2 | in part | 0.3 to 0.5 | stable | ○ | 5 to 15 |
| Example 3 | in part | 0.2 to 0.3 | stable | ○ | 3 to 5 |
| Example 4 | mottle | 0.3 to 0.4 | stable | ○ | 6 to 11 |
| Example 5 | mottle | 0.2 to 0.4 | stable | ○ | 4 to 12 |
| Example 6 | in part | 0.3 | stable | ○ | 3 to 4 |
| Example 7 | in part | 0.2 to 0.4 | stable | ○ | 4 to 8 |
| Example 8 | mottle | 0.2 to 0.4 | stable | ○ | 4 to 8 |
| Example 9 | mottle | 0.2 to 0.4 | stable | ○ | 3 to 8 |
| Example 10 | mottle | 0.3 to 0.5 | stable | ○ | 8 to 15 |
| Comparative Example 1 | on whole surface | 0.3 to 5 | deteriorted with time | x | 4 to 30 |
| Comparative Example 2 | on whole surface | 0.2 to 2 | unstable and largely deteriorated | ○ | 7 to 16 |
| Comparative Example 3 | mottle and uneven | 0.3 to 0.5 | slightly unstable | x | 14 to 26 |
| Comparative Example 4 | in part | 0.2 to 0.5 | slightly unstable | ○ | 20 to 30 |
| Comparative Example 5 | mottle | 0.2 to 0.4 | largely unstable with time | Δ–x | 16 to 26 |
| Comparative Example 6 | mottle | 0.3 | largely unstable with time | x | 20 |

Evaluation of noise in Table 2 is as follows.
○: No noise occurs.
Δ: Noise sometimes occurs with time.
x: Noise always occurs with time.

In the evaluation this time the abrasion losses were actual numerical data and no evaluation was conducted as to the values. It can be generally mentioned that the smaller the abrasion loss, the smaller the abrasion powder and thus the better. Therefore, if evaluation is made for the numerical data, for example, for Comparative Example 5 where the wear loss is 16 to 26 $\mu$m, the minimum loss of 16 $\mu$m will pose no specific problem but the maximum loss of 26 $\mu$m will pose a problem.

From these results, it is first apparent from the relation between the transfer film and the performance that the torque performance is deteriorated in the case of the samples with thick transfer film and that the motor is apt to make noise and its torque is unstable in the case of the samples with mottled transfer films, as in the case of the materials containing the single filler.

Further, from the relation between the thickness of transfer film and the filler contents of polyimide and carbon fiber, the transfer film is thick when polyimide is contained in a larger amount than carbon fiber. When the content of polyimide is not more than three times that of carbon fiber, the thickness of the transfer film is not more than 0.6 $\mu$m and there is little variation. The transfer film becomes mottled when the total filler content is low and abrasion loss is great and when the content of carbon fiber is greater than that of polyimide. Quantitatively, the mottled transfer films appear when the content of carbon fiber is not less than three times that of polyimide.

As a whole, the thickness of the transfer film varies depending upon the amount of carbon fiber even at the constant absolute value of polyimide and the thickness of the transfer film also varies depending upon the amount of polyimide even at the constant amount of carbon fiber.

It is seen from the above that polyimide promotes the formation of transfer film but carbon fiber restrains the formation of transfer film.

As for abrasion, the results were such that the abrasion loss was small when the content of carbon fiber and polyimide was not less than 8% and not more than 30% and that the abrasion loss was large when the resin did not contain both carbon filler and polyimide.

In general, it has been mentioned heretofore from the empirical aspect that polyimide had the effect of increasing the strength of the transfer film of PTFE, but the mechanism thereof is rendered to future studies. In the experiments this time, the materials with a lot of polyimide tended to form the transfer film which seemed tenacious. This determination was made from the state of elongation of the transfer film spreading over the friction surface. Conversely, when the content of carbon fiber was large, the transfer film seemed brittle from the same aspect. The reason is not clear yet, but it is assumed that PTFE came to contain fine abrasion powder made by friction of carbon fiber. It can also be considered that the action of carbon fiber itself physically shaving the transfer film also acts to control the thickness of the transfer film.

As described above, the vibration wave motors can be constructed with less noise with time and with stable performance, by selecting the ratio of filler contents.

For promoting the formation of transfer film, it is conceivably effective to add lead oxide, metal molybdenum, or the like generally considered to have the function of promoting the formation of transfer film, in addition to polyimide. As for the heat-resistant resin, aromatic polyester has the weaker effect of promoting the formation of transfer film than polyimide, but it can replace polyimide, because it causes little damage to the counterpart.

In order to control the transfer film and prevent abrasion due to the laminar exfoliation of the matrix PTFE or abrasion due to creep, the inorganic fiber substance can be a fibrous substance such as glass fiber, potassium titanate whisker, or the like instead of carbon fiber, but carbon fiber is superior in thermal conductivity.

The carbon fiber used herein was of the anisotropic carbonization grade, but similar results to those this time can also be yielded using any other carbon fiber selected from those of the isotropic graphitization grade, and the pitch-based and PAN-based carbon fibers.

A sample containing 1 vol % of molybdenum disulfide as a friction regulator also demonstrated a similar tendency and also revealed the effect of stable torque performance.

The friction member of this type can also be used of course in the vibration wave motor having the driving part of the comb-teeth shape, but in that case, because the PTFE resin is a little inferior in the creep characteristic, the comb-teeth shape is transferred to the PTFE resin after kept in a standstill state over a long period, and level differences are made in the friction surface, so as to deteriorate the motor characteristics in some cases. It is thus better to bond a resin onto the comb teeth and make the rotor of a friction material of anti-resin.

For example, in cases wherein the vibration member as a movement member is kept in press contact on a flat plate support member and the vibration member itself is moved by the traveling vibration wave generated on the vibration member, it is also possible to construct a self-propelled structure by using the friction material on the flat plate and bonding the PTFE composite resin of the same kind as in the present embodiment, to the vibration member.

In the present invention, it is desirable that the content of PTFE as a matrix of the composite resin be in the range of 70 to 92 vol % and preferably in the range of 73 to 87 vol % and that the total content of the inorganic fiber substance and the heat-resistant resin be in the range of 8 to 30 vol % and preferably in the range of 13 to 27 vol %.

It is also desirable that the ratio of the content Vf (vol %) of the inorganic fiber substance to the content Vr (vol %) of the heat-resistant resin be in the range of $1/3 \leq Vf/Vr \leq 3$ and preferably in the range of $0.6 \leq Vf/Vr \leq 1.6$.

Figure 2A:
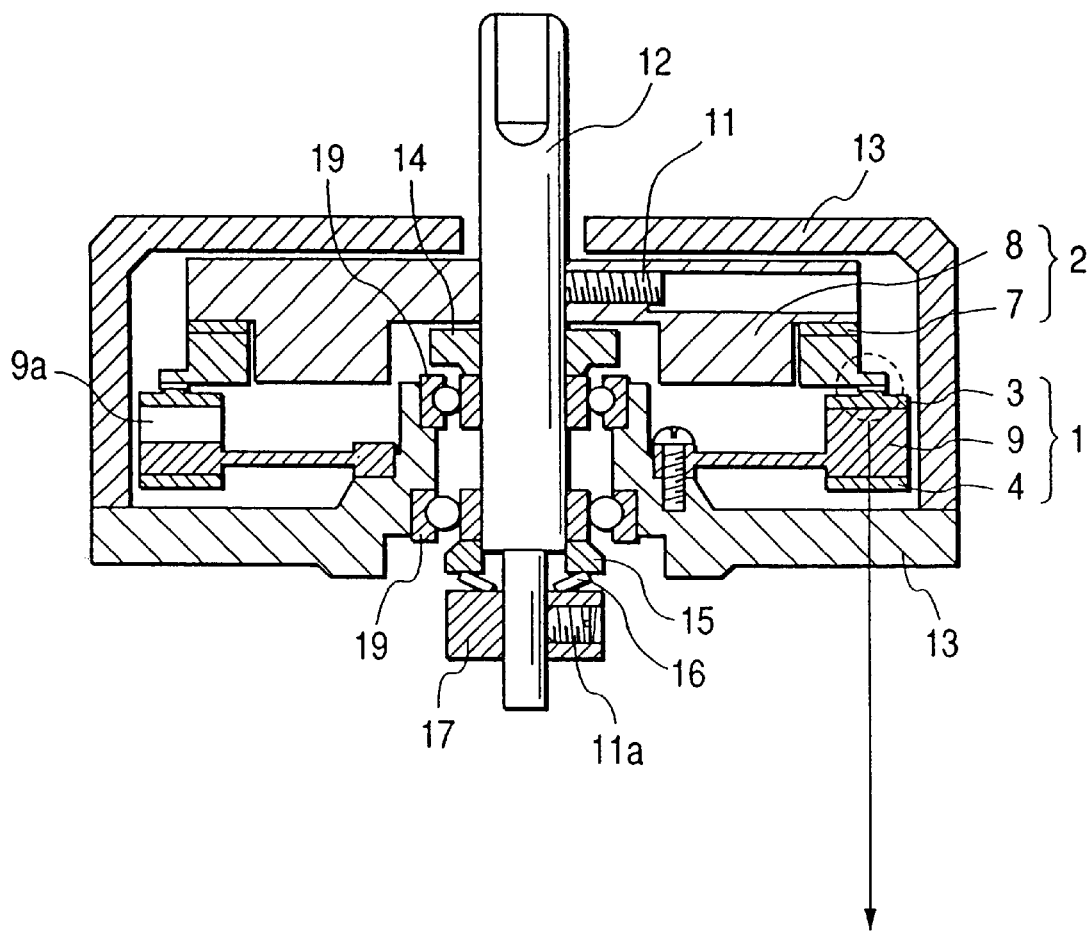
FIG. 2A is a cross-sectional view to show an example of the vibration wave motor of the present invention.

FIG. 2A is a cross-sectional view to show an example of the vibration wave motor as an embodiment of the vibration wave driving apparatus according to the present invention. In the figure, reference numeral 1 designates the vibration member in which two groups of piezoelectric elements 4 of the ring shape polarized in plural poles as described previously are bonded with a heat-resistant epoxy-resin-based adhesive to one end face of a ring metal elastic member 9 made of stainless steel and in which the friction member 3 is similarly bonded to the other end face of the metal elastic member 9.

Figure 2B:
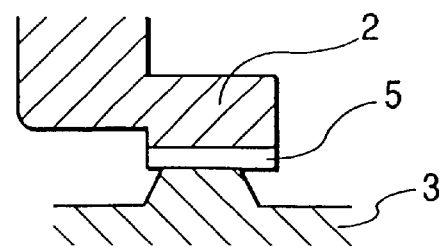
FIG. 2B is an enlarged view of a portion of FIG. 2A

On the other hand, a friction member 5 is placed on a friction surface of a ring contact member made of an aluminum alloy on the side of the movement member 2 (see FIG. 2B. The contact member is attached through a rubber ring 7 to a support member 8 and the support member 8 is fixed to an output shaft 12 with a screw 11. The friction member 3 of the vibration member 1 and the friction member 5 of the movement member 2 are kept in contact with each other to form frictional contact surfaces and are pressed, for example, under the total load of 5 kgf in the axial direction by a plate spring 16 for pressing. Numeral 19 denotes bearings, 13 a cover, 14 and 15 preload collars, and 17 a collar which is fixed to the output shaft 12 with a screw 11a.

When the alternating voltage of the natural frequency of the vibration member 1 is applied to the two groups of piezoelectric elements 4 polarized alternately in the direction of thickness, the vibration member 1 brings about resonance to generate the traveling vibration wave in the circumferential direction thereof, whereupon the frictional force acts on the friction member 5 through the friction member 3 to rotate the movement member 2.

In the present invention, since the frictional contact portion of one of the above vibration member and movement member is made of the composite resin which contains polytetrafluoroethylene as a matrix and at least one inorganic fiber substance and at least one heat-resistant resin and in which the ratio of the content Vf (vol %) of the inorganic fiber substance to the content Vr (vol %) of the heat-resistant resin is $1/3 \leq Vf/Vr \leq 3$, abrasion of the frictional contact surfaces of the vibration motor can be suppressed.

The above embodiment showed the example of application of the friction member to the disk-shaped vibration wave motor illustrated in FIG. 2A, but the frictional contact surface provided with the above friction member may also be formed in a rod-shaped vibration wave motor by a similar method, in addition to the above example.

Figure 3:
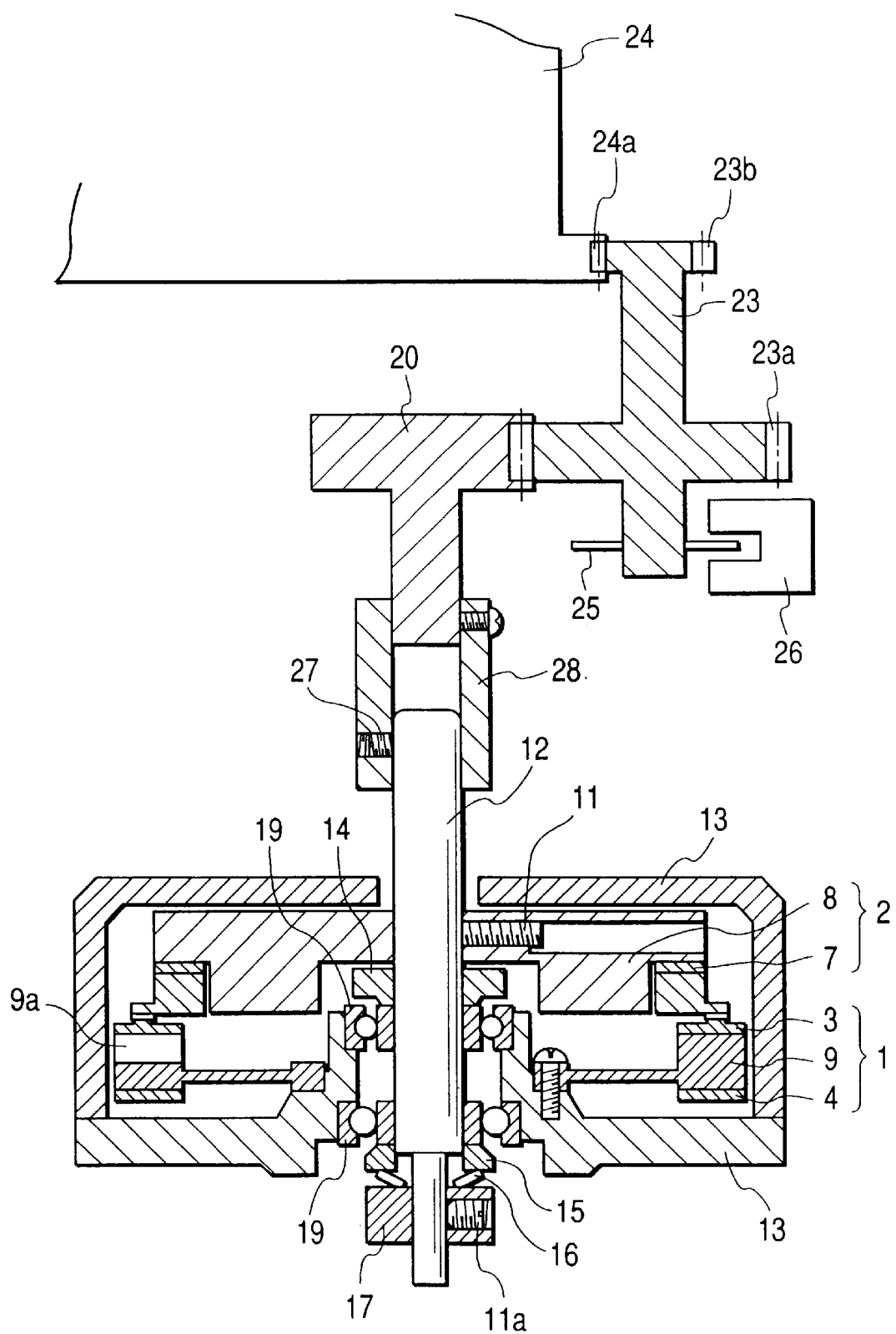
FIG. 3 is a schematic diagram of a device using the vibration wave motor illustrated in FIGS. 2A and 2B as a driving source.

FIG. 3 is a schematic diagram of a device using the vibration wave motor illustrated in FIG. 2A, as a driving source. Numeral 23 represents a gear having a large gear part 23a and a small gear part 23b, and the large gear part 23a is in mesh with a gear 20 on the vibration wave motor side. The gear 20 is driven by the output shaft 12 through a coupling 28 fixed to the output shaft 12 with a screw 27. Numeral 24 indicates a driven member, which is, for example, a lens barrel. The small gear part 23b of the gear 23 is in mesh with a gear 24a formed in the outer periphery of the driven member 24. The driven member 24 is rotated by the driving force of the motor. On the other hand, an encoder slit plate 25 is attached to the gear 23 to detect rotation of the gear 23 with a photocoupler 26 and control the rotation and stop of the motor, for example, for autofocusing.

What is claimed is:

1. A friction member used in a friction portion in a vibration wave driving apparatus, said friction member comprising:
   a composite resin comprising a polytetrafluoroethylene matrix and further comprising at least an inorganic fiber substance and a heat-resistant resin,
   wherein a ratio of a content Vf (vol %) of said inorganic fiber substance to a content Vr (vol %) of said heat-resistant resin satisfies the following relation:

$$1/3 \leq Vf/Vr \leq 3.$$

2. A member according to claim 1, wherein said inorganic fiber substance is carbon fiber.

3. A member according to claim 2, wherein the sum of the content Vf (vol %) of said inorganic fiber substance and the content Vr (vol %) of said heat-resistant resin satisfies the following relation:

$$8 \leq Vf+Vr \leq 30.$$

4. A member according to claim 2, wherein said composite resin further comprises molybdenum disulfide as a friction regulator.

5. A member according to claim 1, wherein said heat-resistant resin is aromatic polyester or polyimide.

6. A member according to claim 5 wherein the sum of the content Vf (vol %) of said inorganic fiber substance and the content Vr (vol %) of said heat-resistant resin satisfies the following relation:

$$8 \leq Vf+Vr \leq 30.$$

7. A member according to claim 5, wherein said composite resin further comprises molybdenum disulfide as a friction regulator.

8. A member according to claim 1, wherein the sum of the content Vf (vol %) of said inorganic fiber substance and the content Vr (vol %) of said heat-resistant resin satisfies the following relation:

$$8 \leq Vf+Vr \leq 30.$$

9. A member according to claim 8, wherein said composite resin further comprises molybdenum disulfide as a friction regulator.

10. A member according to claim 1, wherein said composite resin further comprises molybdenum disulfide as a friction regulator.

11. A vibration wave driving device comprising:
    a vibration member having a frictional contact portion; and
    a contact member having a frictional contact portion, said vibration member and said contact member being arranged in contact so as to move relative to one other,
    wherein a friction member used in the frictional contact portion of one of said vibration member and said contact member is a composite resin which comprises a polytetrafluoroethylene matrix and which further comprises at least an inorganic fiber substance and a heat-resistant resin, wherein a ratio of a content Vf (vol %) of said inorganic fiber substance to a content Vr (vol %) of said heat-resistant resin in said composite resin satisfies the following relation:

$$1/3 \leq Vf/Vr \leq 3.$$

12. A device according to claim 11, wherein said composite resin is used for the frictional contact portion of said vibration member.

13. A device according to claim 12, wherein the frictional contact portion of said vibration member is formed in a comb-teeth shape of a plurality of projections and said composite resin is arranged on said plurality of projections.

14. A device according to claim 13, wherein tungsten carbide is used as a friction material in the other one of said frictional contact portions.

15. A device according to claim 13, wherein the sum of the content Vf (vol %) of said inorganic fiber substance and the content Vr (vol %) of said heat-resistant resin satisfies the following relation:

$$8 \leq Vf+Vr \leq 30.$$

16. A device according to claim 11, wherein tungsten carbide is used as a friction material in the other one of said frictional contact portions.

17. A device according to claim 14, wherein said composite resin further comprises molybdenum disulfide as a friction regulator.

18. A device according to claim 11, wherein the sum of the content Vf (vol %) of said inorganic fiber substance and the content Vr (vol %) of said heat-resistant resin satisfies the following relation:

$$8 \leq Vf+Vr \leq 30.$$

19. A device according to claim 11, wherein said composite resin further comprises molybdenum disulfide as a friction regulator.

20. A device comprising said vibration wave driving device as set forth in claim 11, as a driving source.

21. A lens barrel for driving a driven member, using said vibration wave driving device as set forth in claim 11, as a driving source.

* * * * *

UNITED STATES PATENT AND TRADEMARK OFFICE
CERTIFICATE OF CORRECTION

PATENT NO. : 6,320,299 B1
DATED : November 20, 2001
INVENTOR(S) : Koji Kitani et al.

It is certified that error appears in the above-identified patent and that said Letters Patent is hereby corrected as shown below:

Column 3,
Line 21, "invention; and" should read -- invention and FIG. 2B is an enlarged view of a portion of FIG. 2A; and --.
Line 22, should be deleted.
Line 49, "etc." should read -- etc., --.

Column 5,
Line 39, "(volt)" should read -- (vol %) --.
Line 43, "follows;" should read -- follows: --.

Column 7,
Line 66, "after" should read -- after being --.

Column 8,
Line 37, "FIG.2B" should read -- FIG. 2B). --.

Column 10,
Line 12, "other" should read -- another --.

Signed and Sealed this

Twenty-third Day of July, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,320,299 B1  Page 1 of 1
DATED : November 20, 2001
INVENTOR(S) : Koji Kitani et al.

It is certified that error appears in the above-identified patent and that said Letters Patent is hereby corrected as shown below:

Column 10,
Line 43, "claim 4", should read -- claim 16 --.

Signed and Sealed this

Twenty-ninth Day of April, 2003

JAMES E. ROGAN
*Director of the United States Patent and Trademark Office*